United States Patent
DiNello et al.

(10) Patent No.: US 9,388,834 B2
(45) Date of Patent: Jul. 12, 2016

(54) ROTATING ATTACHMENT DEVICE AND METHOD OF USE

(75) Inventors: Salvatore Joseph Franco DiNello, Macomb, MI (US); Michael John Abraham, Grosse Pointe Woods, MI (US); Karl Sommer, Rochester Hills, MI (US)

(73) Assignee: VISOR FRAMES, LLC, Clinton Township, MI (US)

(*) Notice: Subject to any disclaimer, the term of this patent is extended or adjusted under 35 U.S.C. 154(b) by 124 days.

(21) Appl. No.: 13/608,473

(22) Filed: Sep. 10, 2012

(65) Prior Publication Data

US 2013/0062489 A1 Mar. 14, 2013

Related U.S. Application Data

(60) Provisional application No. 61/532,288, filed on Sep. 8, 2011.

(51) Int. Cl.
| | | |
|---|---|---|
| A47B 96/00 | (2006.01) |
| F16B 2/20 | (2006.01) |
| F16M 13/02 | (2006.01) |
| B60R 11/00 | (2006.01) |
| F16B 21/09 | (2006.01) |

(52) U.S. Cl.
CPC ............... *F16B 2/20* (2013.01); *F16M 13/022* (2013.01); *B60R 2011/0035* (2013.01); *F16B 21/09* (2013.01); *Y10T 29/49826* (2015.01)

(58) Field of Classification Search
CPC ..... F16M 13/022; F16M 13/00; F16M 13/02; F21V 21/08; F21V 21/088; F16L 3/13; Y10S 248/916; F16B 21/09

USPC .......... 248/222.41, 223.21, 224.8, 221.12, 248/224.3, 916, 911, 912, 207, 558, 240, 248/551, 553, 221; 403/231, 246, 384, 71, 403/584, 353

See application file for complete search history.

(56) References Cited

U.S. PATENT DOCUMENTS

| | | | | |
|---|---|---|---|---|
| 396,508 | A | * | 1/1889 | Pearson .......................... 281/4 |
| 936,527 | A | * | 10/1909 | Fisher ............................. 232/39 |
| 993,818 | A | * | 5/1911 | Bethea ............................ 40/584 |
| 1,951,196 | A | * | 3/1934 | Amos et al. ...................... 5/209 |
| 2,277,738 | A | * | 3/1942 | Wilkinson ................... 210/249 |
| 3,055,462 | A | * | 9/1962 | Steele ............................. 403/18 |
| 3,159,368 | A | * | 12/1964 | Ahlbin et al. ............ 248/222.41 |
| 3,282,519 | A | * | 11/1966 | Rheinstrom ............... 242/596.8 |

(Continued)

FOREIGN PATENT DOCUMENTS

EP 0933537 8/1999

OTHER PUBLICATIONS

International Search & Written Opinion dated Feb. 25, 2013 (Appln. No. PCT/US2012/054417).

(Continued)

*Primary Examiner* — Kimberly Wood
(74) *Attorney, Agent, or Firm* — The Dobrusin Law Firm, PC

(57) ABSTRACT

The present teachings relate to an improved rotating connector portion and clip portion for attachment to a secondary item. More specifically, the present teachings relate to a connector portion and clip portion that can be attached to a secondary item, such that the clip portion may be rotated about the secondary item.

20 Claims, 6 Drawing Sheets

(56) References Cited

U.S. PATENT DOCUMENTS

| | | | | |
|---|---|---|---|---|
| 3,455,528 | A * | 7/1969 | Meyer | 248/73 |
| 3,529,860 | A * | 9/1970 | Jelley | 160/402 |
| 3,986,318 | A * | 10/1976 | McConnell | 403/384 |
| 4,106,630 | A * | 8/1978 | Rosenband | 211/191 |
| 4,140,414 | A * | 2/1979 | Buttgereit | 403/71 |
| 4,220,308 | A * | 9/1980 | Strien et al. | 248/424 |
| 4,266,386 | A * | 5/1981 | Bains | 52/481.2 |
| 4,307,865 | A * | 12/1981 | MacCready | 248/424 |
| 4,473,316 | A | 9/1984 | Welch | |
| 4,603,829 | A * | 8/1986 | Koike et al. | 248/553 |
| 4,725,029 | A * | 2/1988 | Herve | 248/221.12 |
| 4,783,034 | A * | 11/1988 | Ostrander et al. | 248/221.12 |
| 4,893,777 | A * | 1/1990 | Gassaway | 248/551 |
| 5,013,000 | A * | 5/1991 | Gassaway | 248/551 |
| 5,143,331 | A * | 9/1992 | Robert | 248/27.1 |
| 5,150,415 | A * | 9/1992 | Jaffee et al. | 381/104 |
| 5,209,445 | A * | 5/1993 | Bergetz | 248/551 |
| 5,420,762 | A * | 5/1995 | Lewis | 362/549 |
| 2,592,767 | A | 1/1997 | Treske | |
| 5,592,767 | A | 1/1997 | Treske | |
| 5,738,020 | A * | 4/1998 | Correia | 109/51 |
| 5,778,804 | A | 7/1998 | Read | |
| 6,010,306 | A * | 1/2000 | Bucher et al. | 416/210 R |
| 6,131,361 | A * | 10/2000 | Murphy | 52/712 |
| 6,193,198 | B1 * | 2/2001 | Baur et al. | 248/222.41 |
| 6,517,276 | B2 * | 2/2003 | Chen | 403/231 |
| 6,564,432 | B1 | 5/2003 | Kushner | |
| 7,299,667 | B1 * | 11/2007 | Miresmaili | 70/58 |
| 7,934,607 | B2 * | 5/2011 | Henderson et al. | 211/26 |
| 2004/0232298 | A1 * | 11/2004 | Bremmon et al. | 248/281.11 |
| 2006/0254101 | A1 | 11/2006 | Callison et al. | |
| 2008/0107479 | A1 * | 5/2008 | Yang | 403/155 |
| 2008/0237434 | A1 * | 10/2008 | Lin | 248/497 |
| 2009/0321595 | A1 | 12/2009 | Conway et al. | |
| 2011/0023364 | A1 * | 2/2011 | Euteneuer et al. | 49/25 |
| 2011/0204758 | A1 * | 8/2011 | Loncar et al. | 312/223.1 |

OTHER PUBLICATIONS

PCT International Preliminary Report on Patentability dated Mar. 20, 2014; Appln No. PCT/US2012/054417.

* cited by examiner

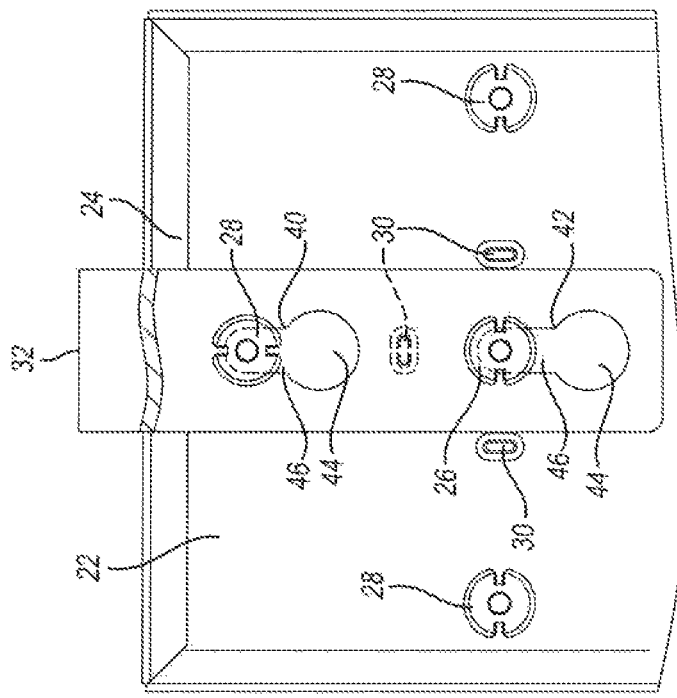
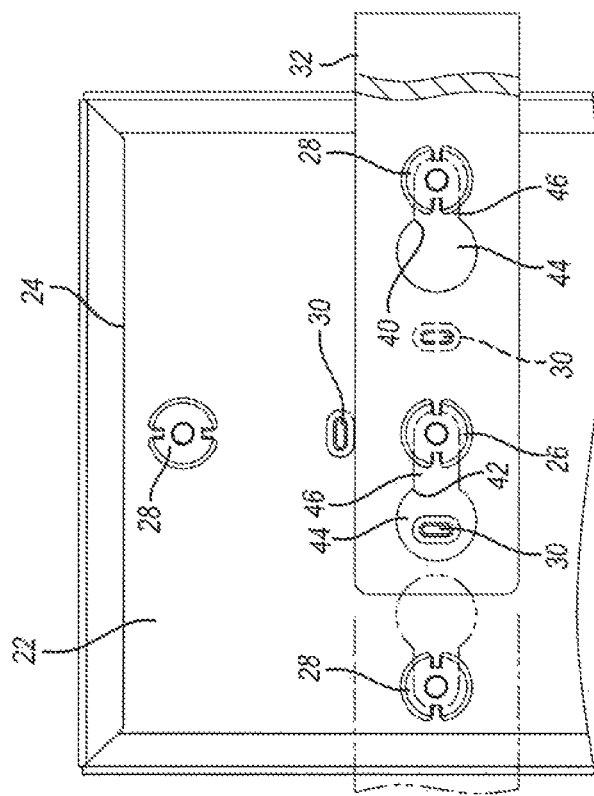
Fig-7
Fig-6

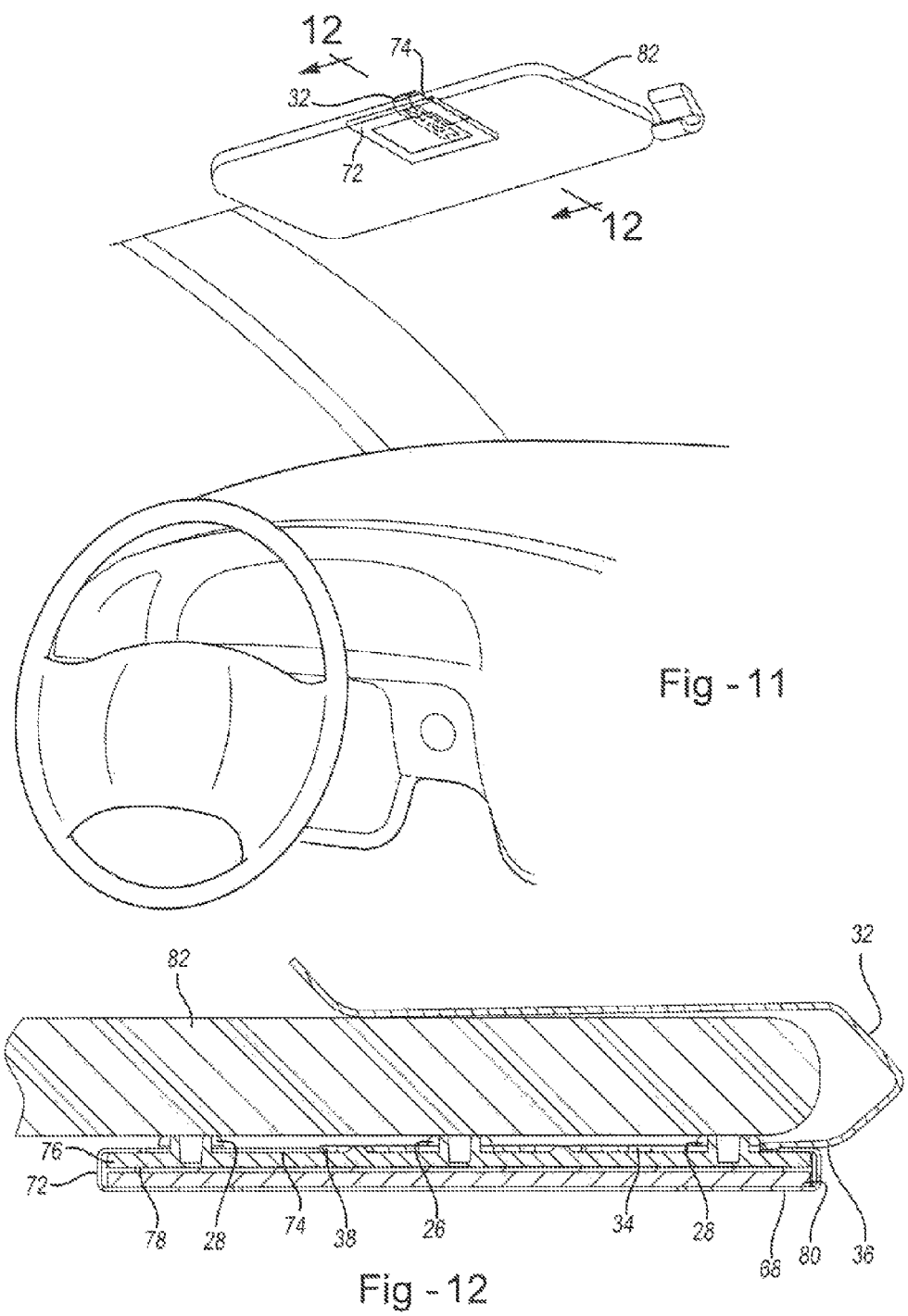

ROTATING ATTACHMENT DEVICE AND METHOD OF USE

PRIORITY CLAIM

The present application claims the benefit of the filing date of U.S. Provisional Application Ser. No. 61/532,288 (filed Sep. 8, 2011), the entirety of the contents of this application being hereby expressly incorporated by reference.

FIELD OF THE INVENTION

The present teachings relate to a rotating connector device and clip structure. More specifically, the present teachings relate to connector for attachment to a secondary item that allows for rotation of the secondary item maintaining a connection between the connector and secondary item.

BACKGROUND OF THE INVENTION

There is frequently a desire to keep important and special items nearby and in plain view, especially within a vehicle. However, existing solutions fail to provide a mechanism that not only securely maintains and displays these items, but is also visually pleasing, easily accessible, minimally distractive, does not destroy the items and has a means to easily modify the direction and position of the items. While vehicles are one location where item storage and display is necessary, there are an endless number of alternative locations where an individual may want to have easy access to or viewing of important and special items. Lockers, cubicles, bathrooms, classrooms, offices, storage rooms, basements and garages are just a few examples of such locations. Current products often use hook-and-loop fasteners, adhesives, elastic, nails, screws or the like which result in permanent attachment, or damage to an attaching surface or an item upon removal of the item from a surface.

As one specific example, an individual may wish to display and, protect a photograph or the like. An example of an item where this product could be used is with the display of photos. It is common for individuals to utilize various ways to honor their family and friends by keeping photos or other memorabilia nearby by at all times. Often, it may be desirable to keep such items within a vehicle, or within one of the locations identified above. However, by locating a photo (or any other item) in a vehicle, the photo can be exposed to many environmental hazards. For example, wind from an open window can cause unwanted movement of the photo. The sun can also cause the photo to fade. In addition, there are many challenges to maintaining a photo in a desired location so that it is easily viewed by the driver and so that there is reduced risk of the photo becoming unattached and lost.

As another specific example, an individual may have an interest in attaching not just one type of item to a location, but may wish to interchange the items attached to the vehicle or other location identified herein. More specifically; an individual may wish to attach a cellular phone in one instance, and a frame in another instance. As such, there is a need for attachment devices that are separable and adapted to receive a plurality of different items, provided that the item includes or is adapted to include the necessary connection features.

U.S. Patent Publication No. 2006/0254101 discloses a picture frame for mounting in a vehicle. The frame includes a fastening tape that loops through openings in the back of a frame structure. The publication does not appear to provide any means for easily modifying the direction and position of the frame or for removing the frame from the fastener and replacing the frame with a different frame or different item.

U.S. Pat. No. 6,564,432 discloses a personal article holder, whereby the article holder can be moved to a variety of locations and can receive items that fit within openings created to receive items. The direction of the holder appears to remain static and is a one piece member.

In view of the above, there is a need for an interchangeable attachment mechanism that provides a means to securely display important and special items in a manner that is visually pleasing, easily accessible, minimally distractive, non-damaging to the item and has a means to easily modify the direction and position of how an item is displayed.

SUMMARY OF THE INVENTION

The present teachings address one or more of the above needs by providing a device comprising a connector portion and a clip portion. The connector portion may include at least one side edge, a first attachment point located within the confines of the one side edge, a plurality of secondary attachment points, wherein each of the secondary attachment points is located equidistant from the first attachment point. The connector portion may further be adapted for attachment to a secondary item. The connector portion may include a substantially planar surface that receives one or more of the first attachment point and plurality of secondary attachment points. The plurality of secondary attachment points may comprise at least three secondary attachment points. The plurality of secondary attachment points may comprise only one or two secondary attachment points.

The clip portion may include a planar arm having a first end and an opposing second end. A first opening and second opening may be located along the planar arm, wherein the first opening may be located adjacent the first end and the second opening may be located adjacent the opposing second end of the planar arm. One or more of the clip portion and connector portion may be formed of a metallic material, a polymeric material, or a combination thereof. The first opening located along the planar arm may be adapted to receive the plurality of secondary attachment points and the second opening maybe adapted to receive the first attachment point. The first opening may be located in direct contact with one of the plurality of secondary attachment points. The second opening along the planar arm may be located in direct contact with the first attachment point. One or more of the first opening and second opening may include a receiving portion and a slot portion. The slot portion may have a largest diameter that is less than the largest diameter of the receiving portion. The clip portion may be separable from the connector portion. The clip portion may be adapted for attachment to the connector portion and subsequent removal from the connector portion Each attachment point may be located adjacent a raised pressure ace that engages a third opening of the planar arm of the clip portion when at least one of the plurality of attachment points is located within the slot portion of an opening on the planar arm. One or more of the first attachment point and plurality of secondary attachment points may include at least one vertical wall and a head portion. The head portion may include substantially rounded edges and may have a diameter that is smaller than a largest diameter of the receiving portion of the first and second openings along the planar arm. The top of the head portion may be substantially planar. Additionally one or more of the first attachment point and plurality of secondary attachment points may include a clearance distance between a bottom edge of the head portion and a top surface of the connector portion for receiving the planar arm of the clip portion. The clearance distance is such that that a friction fit attachment forms between the planar arm and the attachment points.

The present teachings further provide for a method that includes use of the device described above, whereby the first attachment point and one of the plurality of secondary attachment points is located into a receiving portion of each of the first and second opening on the planar arm, of the clip portion. The method may further include a step of sliding the clip portion along the connector portion so that the first attachment point and one of the plurality of secondary attachment points enters a slot portion of the first or second openings along the planar arm, wherein the largest diameter of the attachment points is greater than the largest diameter of the slot portion so that the attachment points remain engaged with the slot portions. The clip portion may then be slid along the connector portion so that the first attachment point and one of the plurality of secondary attachment points re-enters the receiving portion, wherein the largest diameter of the attachment points is less than the largest diameter of the receiving portion so that the connector portion is separated from the clip portion. The clip portion may then be re-attached to the connector portion such that a different secondary attachment point is located within an opening along the planar arm, thereby changing the direction of the connector portion relative to the clip portion.

The present teachings meet the aforementioned needs by providing an attachment mechanism that allows for the secure display of important and special items in a manner that is visually pleasing, easily accessible, minimally distractive, non-damaging to the item, and has a means to easily modify the direction and position of how an item is displayed. The present teaching also provide a product that may be used to locate items within a vehicle, cubicle, locker, garage, classroom, storage room, or the like.

BRIEF DESCRIPTION OF THE DRAWINGS

FIG. 6 illustrates possible arrangements of the clip portion with regard to the first attachment and the plurality of secondary attachments.

FIG. 7 illustrates another arrangement of the clip portion with regards to the first attachment and one of the secondary attachments perpendicular to that illustrated in FIG. 6.

FIG. 11 is an illustration of the device as embodied in FIG. 9 used on a visor.

FIG. 12 is a cross-sectional view of FIG. 11.

DETAILED DESCRIPTION

Figure 1:
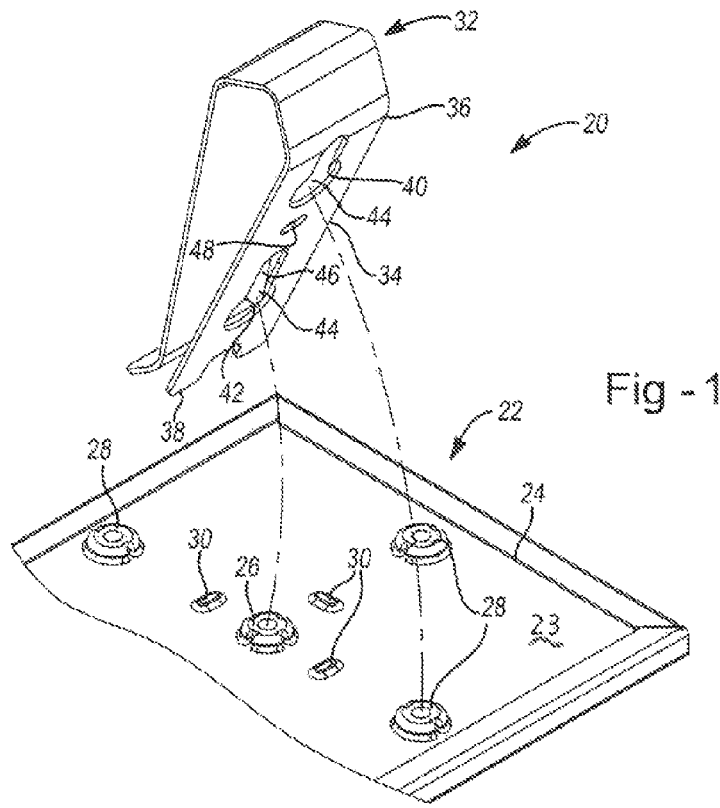
FIG. 1 is an illustrative example of a device in accordance with the present teachings showing the connector portion and clip portion separated.

The device disclosed herein includes a connector portion having one or more side edges and a back panel including a first attachment point located within the confines of the one or more side edges and a plurality of secondary attachment points that are located equidistant from the first attachment point. The connector portion may be formed of a metallic material a polymeric material, or combination thereof. The connector portion may include a substantially planar surface for forming the back plate that receives one or more of the first attachment point and plurality of secondary attachment points. The connector may have two, three or more secondary attachment points. The connector portion may be permanently attached to an item. The connector portion may be integrally formed with an item. The connector portion may be separable from an item. The connector portion may be formed so that it can be connected to a plurality of different items and is thus interchangeable for use with the plurality of items.

The device may further include a clip portion having a planar arm with a first end and an opposing second end. The clip portion may include a flexing arm connected to the planar arm. The flexing arm may be connected to the planar arm via a curved portion. The clip portion may include only the planar arm and may be substantially free of any flexing arm. The clip portion may be formed of a metallic material, a polymeric material, or a combination thereof. The clip portion may further have a first opening and a second opening located along the planar arm. One or more of the first opening and second opening may include a receiving portion and a slot portion. The largest diameter of the slot portion may be smaller than that of the largest diameter of the receiving portion. The clip portion may be separable from the connector portion and may be adapted for attachment to the connector portion and subsequent removal from the connector portion. The clip portion may be formed for connecting to any connector portion having at least one attachment point. The clip portion may be a substantially planar surface.

The first opening along the planar arm may be located adjacent to the first end of the planar arm and may be adapted to receive the plurality of secondary attachment points. The first opening may further be located in direct contact with one of the plurality of secondary attachment points. The first opening may be located in direct contact with a different secondary attachment point when the direction of the connector portion is turned relative to the clip portion. The second opening may be located adjacent to the opposing second end of the planar arm and may be adapted to receive the first attachment point. The second opening may be located in direct contact with the first attachment point. Upon locating one of the plurality of second attachment points into the first opening and locating the first attachment point into the second opening, the clip portion may slide in a direction that moves each attachment point from a receiving portion of the first and second opening into a slot portion of the first and second Opening.

In one possible embodiment of the teachings, one or more raised pressure surfaces may be located adjacent to each attachment point. The raised pressure surface may engage an opening of the planar arm of the clip portion when at least one of the attachment points is located within the slot portion. The raised pressure surface and corresponding opening in the planar arm may act as a lock feature that secures the position of the clip portion and assists in maintaining one or more attachment points in the slot portion of an opening along the planar arm. In other words, the raised pressure surface may substantially prevent the clip portion from unintentional sliding in a direction that moves one or more attachment points from the slot portion of the opening into the receiving portion of the opening (which could result in separation of the connector portion and clip portion).

Figure 4:
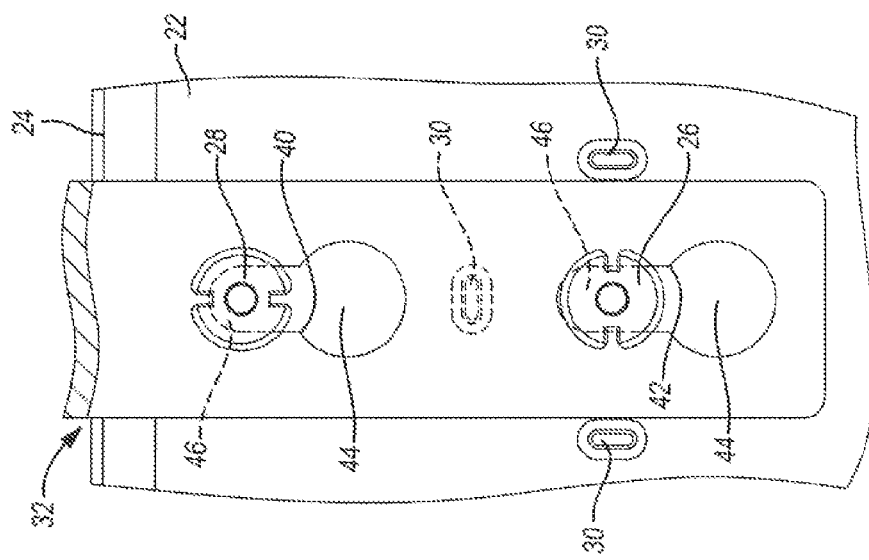
FIG. 4 is an enlarged illustration of the of the slot portions of the clip portion when it is placed over the first and second attachment locations of the connector portion.
Figure 5:
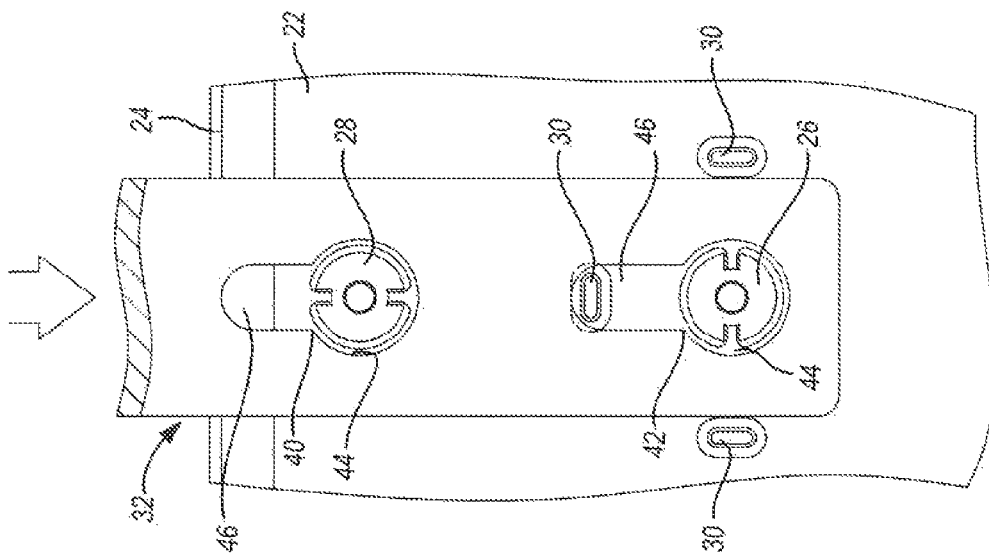
FIG. 5 is an illustration of FIG. 4 after the clip portion has been moved so that the receiving portions of the clip portion are now in contact with the connector portion.

It may also be possible that the raised pressure surface does not include a corresponding opening on the planar arm, but rather simply exerts an upward force on the arm to assist in maintaining the attachment points in their desired location within the slot portions of the openings (as shown in FIGS. 4 and 5). The height of the raised pressure surface may therefore be tuned to create a tension between the pressure surface and planar arm, the tension assisting assist in maintaining the attachment points in their desired location within the slot portions of the openings. The presence of the raised pressure surface may reduce the need for a secure friction fit between the surfaces of the planar arm adjacent the openings and the attachment points. Each raised pressure surface may be located so that when a raised pressure surface is engaged and locking the planar arm in place, the planar arm does not contact an opposing raised pressure surface. In one embodiment, the opposing raised pressure surface may be located within an opening along the planar arm shown for example in FIG. 6).

In another possible embodiment one or more of the first attachment point and plurality of secondary attachment points includes at least one vertical wall and a head portion. The head portion may include substantially rounded edges, may have a substantially planar head portion and may have a diameter that is smaller than the largest diameter of the receiving portion of the openings in the planar arm of the clip portion. In another embodiment there may be a clearance distance between a bottom edge of the head portion and a top surface of the connector portion for receiving the planar arm of the clip portion. The clearance distance may be such that a friction fit attachment forms between the planar arm and the attachment points.

The connector portion may be adapted for attachment to a secondary item or may be part of (e.g., integrally formed with) a secondary item. A secondary item may be a picture frame, smart phone, note pad, sunglasses, suction cup, funeral or cemetery hanger, permanent adhesive bar, table stand, magnet, power outlet adapter or the like. Upon attachment of the secondary item to the connector portion, the connector portion can then be removably connected to the clip portion, rotated, and locked into one of the positions facilitated by the attachment points. Upon attachment to the clip portion, the secondary item can then be located onto any suitable surface for receiving the clip portion. In one embodiment of the teachings, the secondary item may be powered up and/or backlit electronically. Possible embodiments for the secondary item's power supply may be a power port, battery, disposable battery, rechargeable battery, solar panel or the like. A powered secondary device may be programmable and may also connect to another device such as a cell phone, tablet or the like via a wireless connection such as Bluetooth® and the like.

The planar arm of the clip portion may also be adapted so that it includes an attachment means other than a traditional clip structure. As an example, the planar arm including the openings may be attached to a magnet, suction cups, adhesive, a hanger mechanism, a power port, a desktop stand, or the like. In addition to the secondary item for attachment to the connector portion, the clip portion may be adapted to receive other items which may be sunglasses, a credit card holder, a pen holder, a business card holder, a note pad or the like. These items may be attached in addition to the secondary items discussed above.

During use of the connector portion and clip portion, the first attachment point and one of the plurality of secondary attachment points may be located into a receiving portion of each of the first and second opening on the planar arm of the clip portion. The clip portion may then be pulled downward in sliding motion along the connector portion so that the first attachment point and one of the plurality of secondary attachment points enters the slot portion of the first and second openings along the planar arm. The attachment points then remain engaged in the slot portion as the largest diameter of the attachment points is greater than the largest diameter of the slot portion. The clip portion may then be slid along the connector portion so that the first attachment point and one of the plurality of secondary attachment points re-enters the receiving portion, wherein the largest diameter of the attachment points is less than the largest diameter of the receiving portion so that the connector portion is separated from the clip portion. The clip portion may then be re-attached to the connector portion such that a different secondary attachment point is located within an opening along the planar arm, thereby changing the direction of the connector portion relative to the clip portion.

The illustration in FIG. 1 shows the device 20, with the connector portion 22 having a plate portion 23 and plurality of side edges 24. A first attachment point 26 is located within the side edges and a plurality of secondary attachment points 28 are all located equidistant from the first attachment point 26. One or more raised pressure surfaces 30 are located adjacent to the attachment points. FIG. 1 also illustrates the lip portion 32 of the device 20. As illustrated the clip portion 32 has a planar arm 34 with a first end 36 and a second opposing end 38. A first opening 40 and second opening 42 are located on the planar arm 34, with the first opening 40 being located in close proximity to the first end 36 and the second opening 42 being located in close proximity to the second opposite end 38. Both openings include a receiving portion 44 with a larger diameter then the slot portion 46. The first opening 40 aligns with the plurality of secondary attachment points 28 and the second opening 42 aligns with the first attachment point 26. The planar arm 34 has an opening 48 for receiving one or more of the raised pressure surfaces 30.

Figure 2:
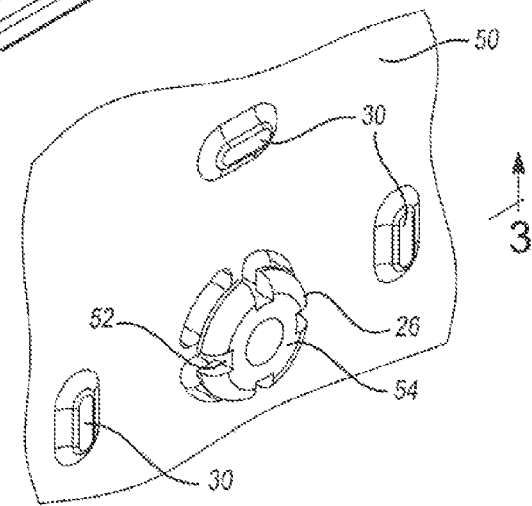
FIG. 2 is an enlarged illustration of the first attachment point in accordance with the present teachings.

An enlarged illustration of the first attachment point 26 is shown in FIG. 2. The first attachment point 26 and raised pressure surfaces 30 rest upon the planar surface 50 of the connector portion 22. The vertical wall 52 and the head portion 54 of the first attachment point may be raised above the planar surface 50 of the connector portion 22.

Figure 3:
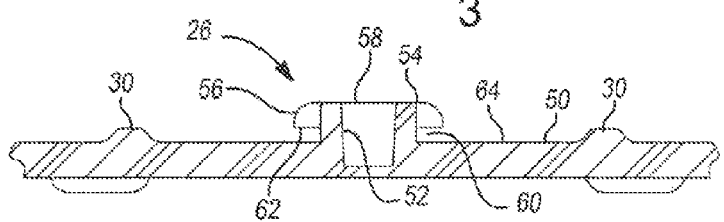
FIG. 3 is a cross sectional view of the first attachment point as indicated by the arrows of FIG. 2.

As shown for example in the cross sectional view FIG. 3, the head portion 54 of the attachment points 28, 28 have rounded edges 56 and planar heads 58. The clearance distance 60 between the bottom edge of the head portion 62 and the top surface of the connector 64 is such that it receives and forms a friction fit engagement with the planar arm of the clip portion (not shown).

The friction fit 86 that results from the securing of the clip portion 32 with the connector portion 22 is illustrated in FIG. 4 and FIG. 5. Upon placement of the receiving portion 44 of the second opening 42 over the first attachment point 26 and the placement of the receiving portion 44 of the first opening 40 over one of the secondary attachment points 26 the clip portion 32 may be moved so that the slot portion 46 of the first opening 40 and the second opening 42 may be secured along the vertical walls 52 of the attachment points. The slot portion 46 may also be secured so that it fills the clearance distance 60 between the bottom edge of the head portion 62 and the to surface of the connector 64.

Figure 9:
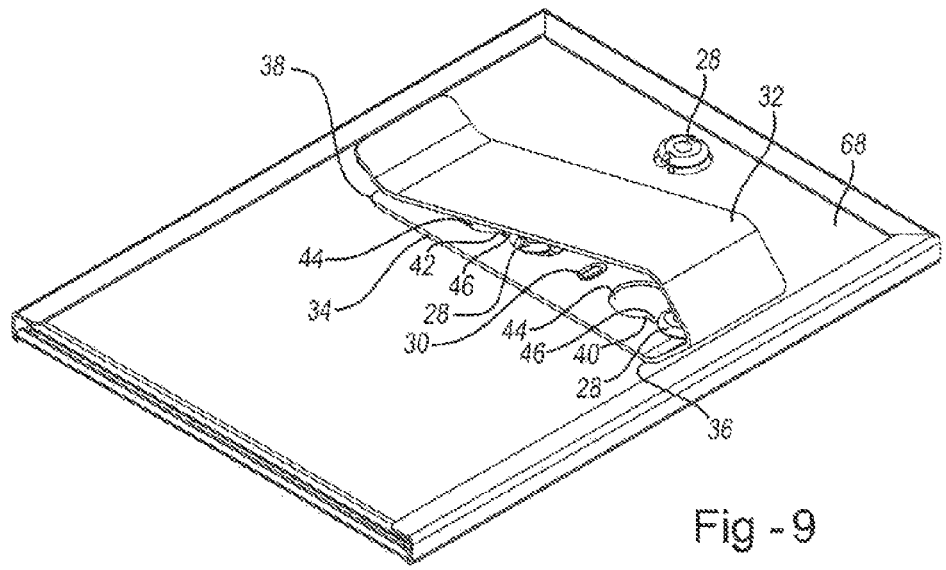
FIG. 9 is an illustration of FIG. 8 where the clip portion is arranged as illustrated in FIG. 6.
Figure 10:
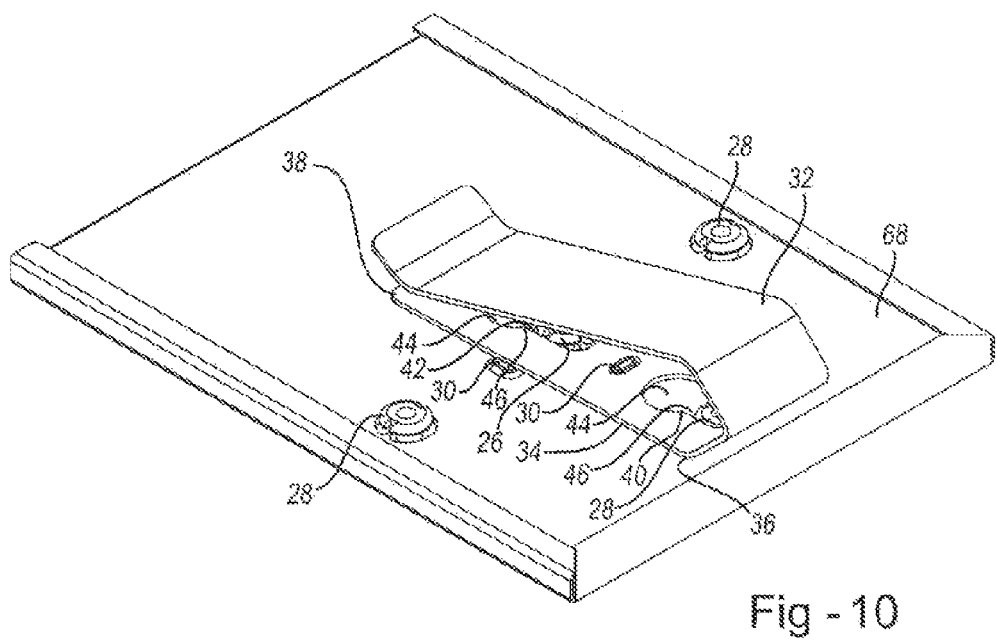
FIG. 10 is an illustration of FIG. 8 where the clip portion arranged as illustrated in FIG. 7.

The ability to modify the direction and position of the device 2 is illustrated in FIGS. 6-7 and FIGS. 9-10. The various arrangements open to the clip portion 32 to attach to the connector portion 22 is dependent upon the number of secondary attachment points 28. The second opening 42 will engage with the first attachment 26 point from any direction. Since each of the secondary attachment points 28 are equidistant from the first attachment point 26 the first opening 40 will engage with a secondary attachment 28 in various directions on the connector portion 22. FIGS. 9-10 provide an illustration of the device 20 in modified directions and positions in a possible embodiment when the connector portion 22 is adapted for use with a frame 68.

Figure 8:
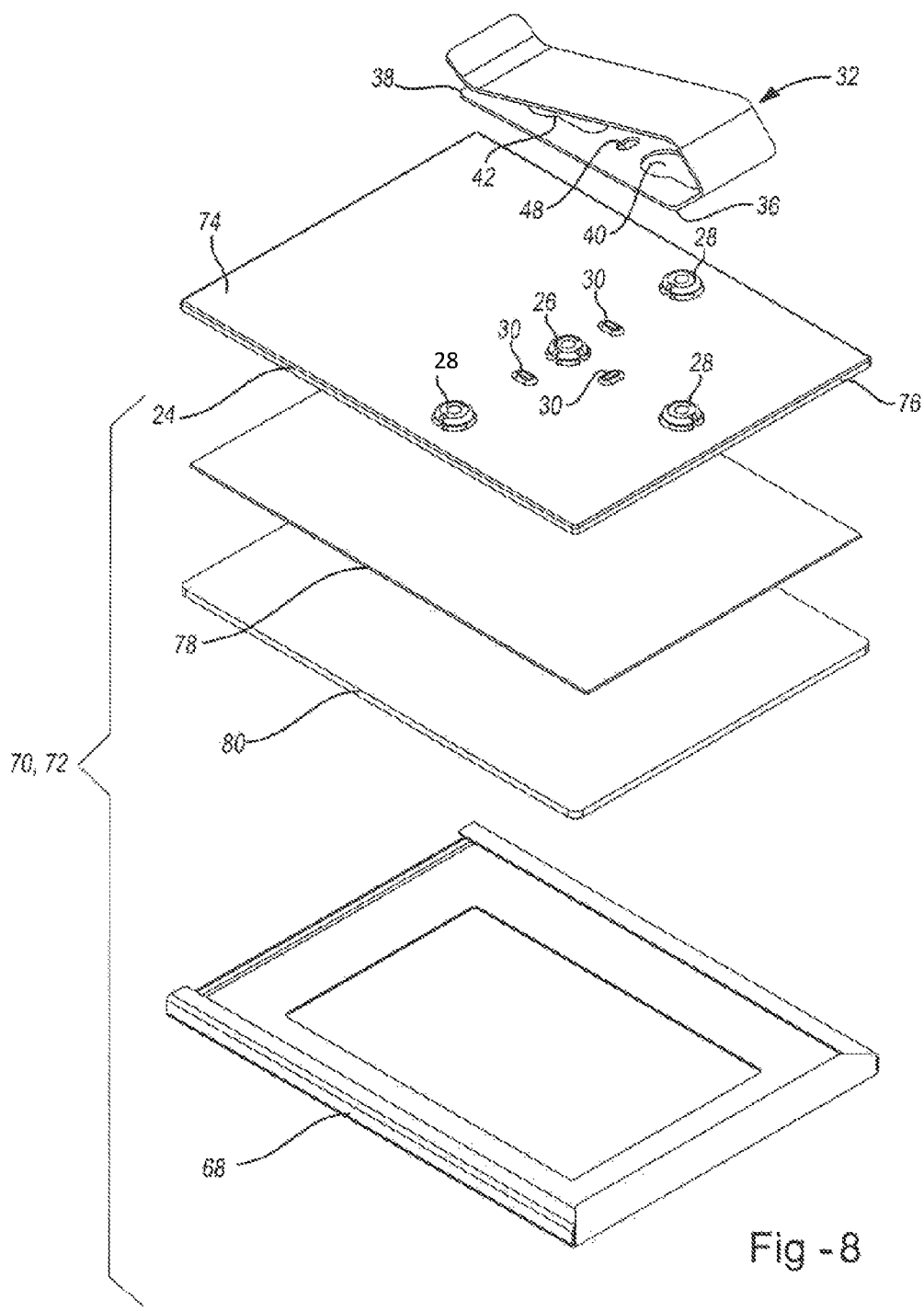
FIG. 8 illustrates a possible embodiment of the device where the connector portion has been adopted for use with a picture frame.

As shown for example in FIG. 8, the connector portion 22 may be adapted for use with a secondary item 70, such as a picture frame 72 or any item having at least one substantially planar surface. In this embodiment, the connector portion 74 is adapted to be the backing of a picture frame 76 to be placed behind an item to be displayed 78 which may be protected from the elements by a window 80 which may be a polymeric or glass material (e.g., a glass, lean or acrylic material) that is substantially clear so that the item may be viewed through the window. The window 80 may be treated so that any item located within the picture frame 72 is protected from degradation from UV rays and other environmental hazards. The clip 3 may still engage the connector portion 22 as discussed above.

The embodiment of the device 20 in combination with a picture frame 72 as described above for FIG. 8 may be used on a sun visor 80 of vehicle as illustrated in FIG. 11 and the cross section of FIG. 11 in FIG. 12.

In one embodiment of the teachings, the clip portion may include a curved portion attached to the planar arm. In another embodiment the clip portion may include a flexing arm. In another embodiment the clip portion may include a flexing arm where the curved portion is attached to the flexing arm and the planar arm, the planar arm located in a generally opposing relationship with the flexing arm. The curved portion provides a requisite amount of flexibility so that the flexing arm has limited movement so that the distance between the flexing arm and planar arm can be expanded slightly when the clip is attached to a location for use. The nature of the curved portion is such that the clip returns to its original state (e.g., the original distance between the flexing arm and planar arm) once it is removed from a location for use. The curved portion may be substantially c-shaped and may include a first end for connecting to the flexing arm and a second end for connecting to the planar arm.

A fastener may be adapted to secure the clip portion to the connector portion via the second opening in the planar arm of the clip portion. The fastener may be removable upon securing the clip portion to the connector portion or may be permanently affixed to the connector portion upon securing the clip portion to the connector portion. The secondary attachment points may also include a fastener. The fastener may similarly be used to attach the planar arm of the clip portion to the connector portion via the first opening in the planar arm of the clip portion. The clip portion may be rotated by positioning the first opening in the planar arm to engage a different secondary attachment point. The fasteners may include one or more screws and washers. The fasteners may be push pin or tree fasteners. The nature of the fasteners may be such that they are formed to have a smooth outer surface and to extend only a minimal distance above the surface of the connector portion. This is in an effort to prevent unwanted damage to any surface to which the device is attached.

The connector portion may be adapted to receive coverings and/or attachments so that the color or appearance of the frame may be easily modified. The frame may receive a covering that includes logos or designs. The coverings and/or attachments may be customizable and interchangeable to adjust to a users interests at a given time.

Materials providing the requisite rigidity for the clip portion and connector portion may include polymeric materials including but not limited to metal materials including aluminum and/or steel, thermoplastics, thermoset plastics, elastomeric containing materials or any combination thereof. Examples of polymeric and elastomeric materials that may be employed include nylon (e.g., a glass-filled nylon), polyvinyl chloride, polypropylene, high-density polyethylene, low-density polyethylene, linear low-density polyethylene, polyvinylidene chloride polyamide, polyester, polystyrene, polyethylene, polyethylene terephthlate, bio-based plastics/biopolymers (e.g., poly lactic acid), silicone, acrylonitrile butadiene styrene (ABS), rubber, polyisoprene, butyl rubber, polybutadiene, EPM rubber, EPDM rubber, or any combination thereof. Additional suitable materials may include bioplastics such as those derived from wood pulp based lignin (e.g., liquid wood), sugarcane or other petroleum-free moldable materials.

One or more of the connector portion and clip portion may be molded or extruded. They may be injection molded, such that the first attachment point and secondary attachment points are integrally molded with the back plate so that after molding the connector portion can be removed from the mold without the need for lifts or slides, thereby reducing manufacturing time and mold cost.

Different components of the device may be composed of different materials. As an example, the clip portion may be formed of a steel material, while the connector portion is formed of aluminum. The clip may be formed of a plastic material, while the connector portion may be formed of a metal material. The device may be adapted to receive a power source, such as a battery, so that digital images may be shown within the frame. The device may be capable of being connected via a USB port or the like, so that images and/or other digital content can be transferred to the device. As such, the device may also include a means for storing the digital content.

The device may be attached via the clip mechanism to any suitable location that may engage the clip such as, a vehicle visor, the side of a cubical, car air vent, a suction cup, car power outlet adaptor and the like. The front side of the connector portion may be adapted to be frame, a note pad holder, smart phone holder, mirror, sunglasses holder and the like. While, the back side of the connector portion will continue to have a first attachment point and one or more secondary attachment points for the clip to attach to.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term may herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended aims along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A device comprising:
    a connector portion having:
        i. at least four side edges;
        ii. a first attachment point located within the confines of the at least four side edges;
        iii. a first, second and third secondary attachment point, wherein each of the secondary attachment points is located equidistant from the first attachment point;
    wherein the connector portion is removably attached and is adapted to act as a back panel;
    a clip portion having:
        i. a planar arm having a first end and an opposing second end;
        ii. a first opening and second opening located along the planar arm, wherein the first opening is located adjacent the first end and the second opening is located adjacent the opposing second end of the planar arm;
    wherein the first opening located along the planar arm is adapted to receive the first, second and third secondary attachment points and the second opening along the planar arm is located in direct contact with the first attachment point;
    wherein one or more of the first opening and second opening include a receiving portion and a slot portion, the slot portion having a largest diameter that is less than a largest diameter of the receiving portion;
    wherein one or more of the first attachment point and plurality of secondary attachment points includes at least one vertical wall and a head portion, including a clearance distance between a bottom edge of the head portion and a top surface of the connector portion for receiving the planar arm of the clip portion; and
    wherein the clearance distance is such that a friction fit attachment forms between the planar arm and the attachment points; and
    wherein: (i) upon connecting the first secondary attachment point to the first opening of the planar arm, the clip portion is located in a first position; (ii) upon connecting the second secondary attachment point to the first opening of the planar arm, the clip portion is located in a second position; and (iii) upon connecting the third secondary attachment point to the first opening of the planar arm, the clip portion is located in a third position.

2. The device of claim 1, wherein one or more of the clip portion and connector portion are formed of a metallic material, a polymeric material, or a combination thereof.

3. The device of claim 1, wherein the connector portion includes a substantially planar surface.

4. The device of claim 1, wherein each attachment point is located adjacent a raised pressure surface that engages an opening of the planar arm of the clip portion when at least one of the plurality of attachment points is located within the slot portion.

5. The device of claim 1, wherein one or more of the first attachment point and plurality of secondary attachment points includes at least one vertical wall and a head portion.

6. The device of claim 1, wherein a top of the head portion is substantially planar.

7. The device of claim 1, including a clearance distance between a bottom edge of the head portion and a top surface of the connector portion for receiving the planar arm of the clip portion.

8. The device of claim 1, wherein the connector portion is substantially rectangular.

9. The device of claim 1, wherein the connector portion is molded plastic.

10. The device of claim 1, wherein the clip portion is metallic.

11. The device of claim 1, wherein the connector portion includes a plate portion.

12. The device of claim 1, wherein the clip portion includes a flexing arm.

13. The device of claim 1, wherein the clip portion includes a substantially planar portion.

14. The device of claim 3, wherein the connector portion is substantially rectangular.

15. The device of claim 3, wherein the clip portion includes a flexing arm.

16. The device of claim 4, wherein the clip portion includes a flexing arm.

17. The device of claim 3, wherein the connector portion includes a plate portion.

18. The device of claim 5, wherein the connector portion includes a plate portion.

19. The device of claim 15, wherein the connector portion is substantially rectangular.

20. The device of claim 16, wherein the connector portion is substantially rectangular.

* * * * *